United States Patent
Jaini

(10) Patent No.: US 9,772,752 B1
(45) Date of Patent: Sep. 26, 2017

(54) MULTI-DIMENSIONAL ONLINE ADVERTISEMENTS

(71) Applicant: Google Inc., Mountain View, CA (US)

(72) Inventor: Shiva Rama Krishna Jaini, Santa Clara, CA (US)

(73) Assignee: Google Inc., Mountain View, CA (US)

( * ) Notice: Subject to any disclaimer, the term of this patent is extended or adjusted under 35 U.S.C. 154(b) by 284 days.

(21) Appl. No.: 14/280,238

(22) Filed: May 16, 2014

(51) Int. Cl.
*G06Q 30/00* (2012.01)
*G06F 3/0483* (2013.01)
*G06Q 30/02* (2012.01)
*G06F 3/0482* (2013.01)
*G06F 3/0484* (2013.01)

(52) U.S. Cl.
CPC .......... *G06F 3/0483* (2013.01); *G06F 3/0482* (2013.01); *G06F 3/04842* (2013.01); *G06Q 30/0257* (2013.01); *G06Q 30/0277* (2013.01)

(58) Field of Classification Search
CPC .......................... G06Q 30/0277; G06Q 30/02
USPC ...................................................... 705/14.73
See application file for complete search history.

(56) References Cited

U.S. PATENT DOCUMENTS

| 2012/0090005 A1* | 4/2012 | Marlow | G06Q 30/0241 725/42 |
| 2013/0124311 A1* | 5/2013 | Sivanandan | G06Q 30/02 705/14.51 |
| 2013/0144720 A1* | 6/2013 | Hari | G06Q 30/0241 705/14.55 |

FOREIGN PATENT DOCUMENTS

JP   2006246521 A  *  9/2006  ........... G06F 3/0482

OTHER PUBLICATIONS

O How to Create or Rotate 3D Shapes in Adobe® Illustrator®. Mar. 2014. Retrieved online May 19, 2017. https://yearbookdiscoveries.com/wp-content/uploads/2014/03/How_to_create_or_rotate_3D_shapes_in_Adobe_Illustrator.pdf.*

* cited by examiner

*Primary Examiner* — James A Reagan
(74) *Attorney, Agent, or Firm* — Lowenstein Sandler LLP

(57) ABSTRACT

A method for displaying ads on a media device includes a processor loading a flippable ad unit onto the media device, the flippable ad unit comprising a primary ad display and alternate ad displays; displaying the primary ad in the primary ad display of the flippable ad unit upon loading the flippable ad unit; receiving a select signal to rotate the flippable ad unit to an alternate ad display;
rotating the flippable ad unit to display the selected alternate ad display; sending an ad request for an alternate ad; receiving the alternate ad for the selected alternate ad display; and displaying the alternate ad in the selected alternate ad display.

14 Claims, 9 Drawing Sheets

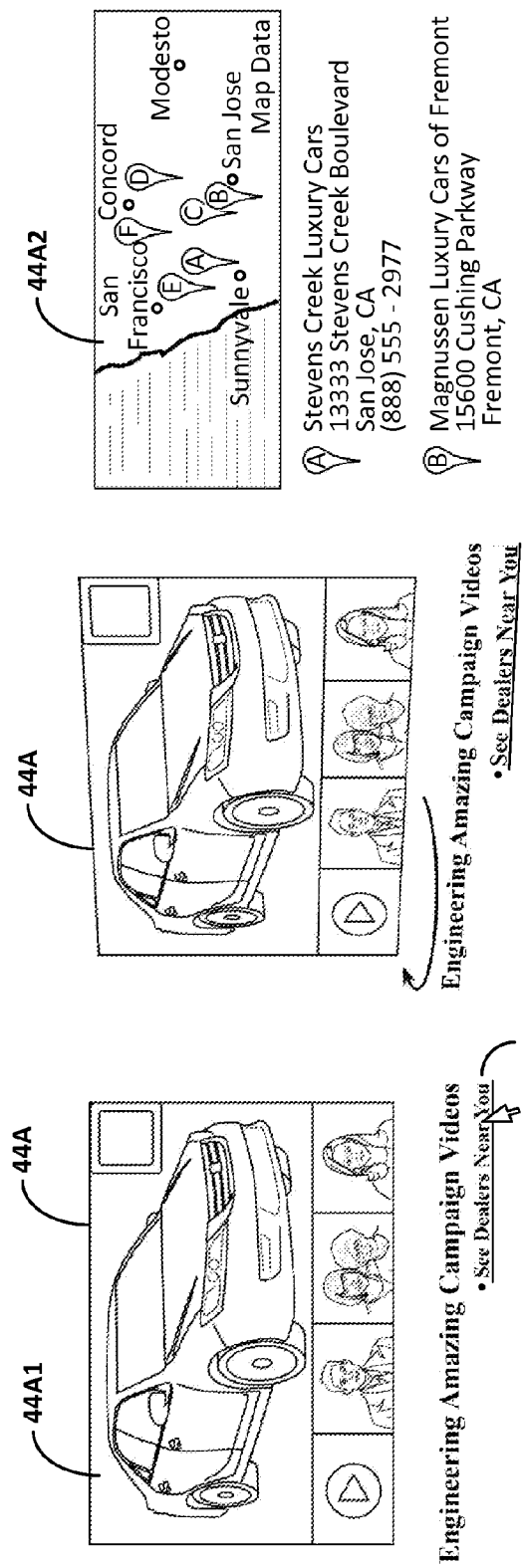

MULTI-DIMENSIONAL ONLINE ADVERTISEMENTS

BACKGROUND

The Interactive Advertising Bureau (IAB) is an advertising business organization that develops industry standards, conducts research, and provides legal support for the online advertising industry. Most online ad formats (e.g., for display, video, and multimedia ads) and their dimensions follow standards approved by the IAB. These standards may limit the amount of space available in an online ad and consequently, the amount of information the advertiser may convey to viewers. As a result of these limitations, even if an advertiser thinks a viewer may be interested in learning a more about the advertiser's products or wants to take certain actions, the advertiser may find it difficult to incorporate all relevant, desired information and possible follow-on actions into an ad and make these options easily available to the viewer in a way that does not degrade the viewer's online experience. For example, to find more information about an advertiser's products, a viewer may have to click on the ad and navigate away from the currently viewed Web page. Navigating away from the Web page may result in a loss of context for the viewers.

SUMMARY

A method for displaying ads on a media device includes a processor loading a flippable ad unit onto the media device, the flippable ad unit comprising a primary ad display and alternate ad displays; displaying the primary ad in the primary ad display of the flippable ad unit upon loading the flippable ad unit; receiving a select signal to rotate the flippable ad unit to an alternate ad display; rotating the flippable ad unit to display the selected alternate ad display; sending an ad request for an alternate ad; receiving the alternate ad for the selected alternate ad display; and displaying the alternate ad in the selected alternate ad display.

A system that implements multi-dimensional online advertisements includes a processor and a computer-readable storage medium storing instructions executed by the processor, wherein when executing the instructions, the processor loads a flippable ad unit onto the media device, the flippable ad unit comprising a primary ad display and alternate ad displays; displays the primary ad in the primary ad display of the flippable ad unit upon loading the flippable ad unit; receives a select signal to rotate the flippable ad unit to select an alternate ad display; rotates the flippable ad unit to display the selected alternate ad display; sends an ad request for an alternate ad; receives the alternate ad for the selected alternate ad display; and displays the alternate ad in the selected alternate ad display.

A multi-dimensional advertising method executed on a remote server includes receiving a first ad request from a media device; selecting a flippable ad unit to in response to the ad request; serving the selected flippable ad unit and a primary ad for display in a primary ad display of the selected flippable ad unit at the media device; providing an index of available alternate ad displays with the served flippable ad unit; based on the index, receiving a second ad request from the media device to display an alternate ad in the flippable ad unit; selecting an alternate ad to serve in an alternate ad display, and serving the selected alternate ad in the alternate ad display at the media device.

DESCRIPTION OF THE DRAWINGS

The detailed description refers to the following figures in which like numerals refer to like objects, and in which:

FIG. 2B illustrates example flippable ad displays, interfaces, and features;

FIG. 2C illustrates example flippable ad displays, interfaces, and features;

FIG. 2D illustrates example flippable ad displays, interfaces, and features;

DETAILED DESCRIPTION

Figure 1:
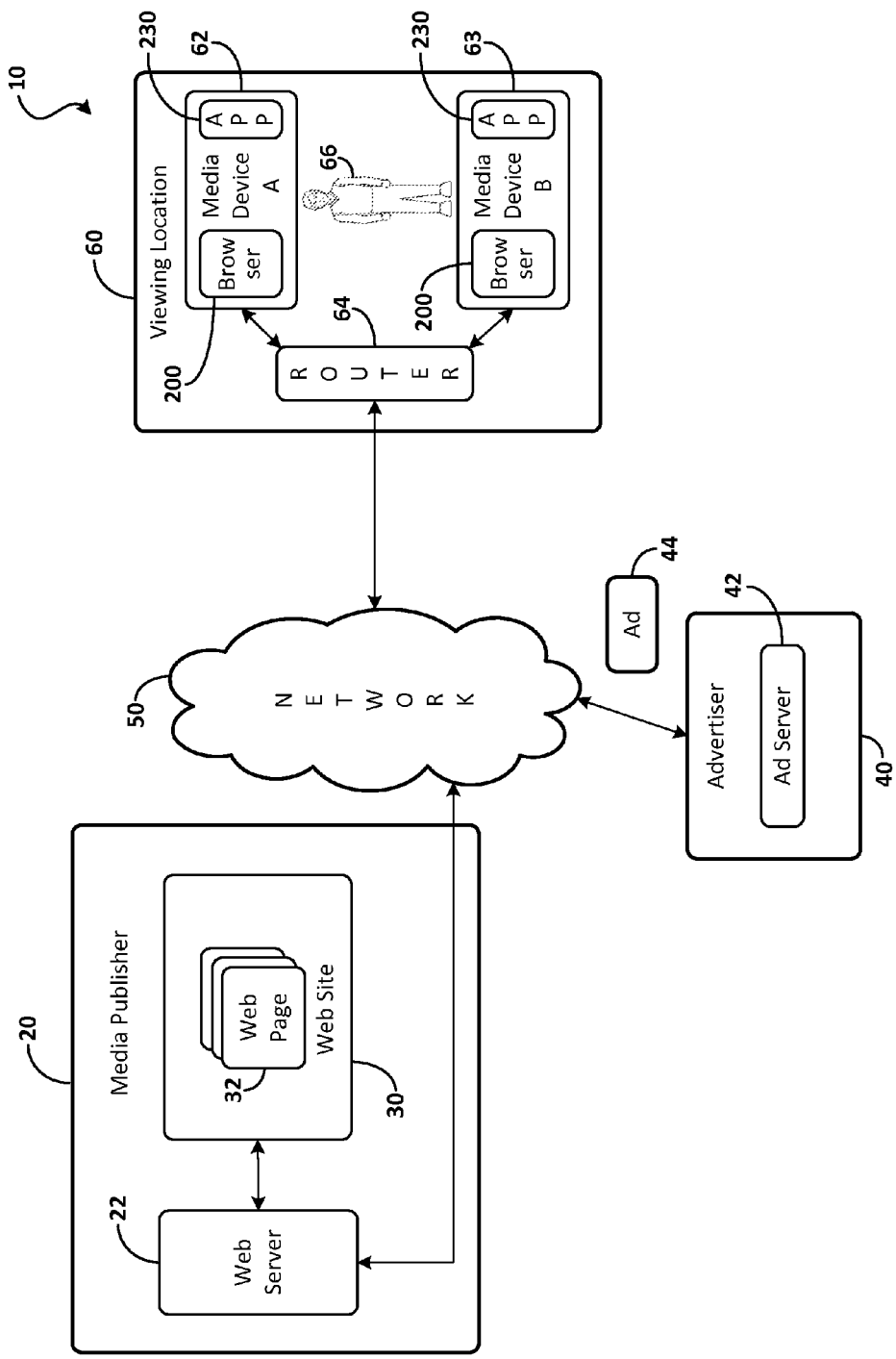
FIG. 1 illustrates an example environment in which multi-dimensional, flippable ads may be implemented.

Advertisers and ad agencies may conform their advertisements to standards established by an independent agency such as the Interactive Advertising Bureau (IAB). These standards may limit information an advertiser may be able to convey to viewers. These standards also may negatively affect a viewer's experience, such as when a viewer's wants to learn more about an advertiser's products, find a location where the products may be purchased, and/or to otherwise interact with the advertisement while still retaining some context associated with the advertisement.

To work within the confines of existing ad formats and yet provide additional ad features that benefit viewers and advertisers alike, disclosed herein are systems and methods that enable and use advertisements having multi-dimensional (e.g., flippable) ad formats. Such multi-dimensional ads may be termed flippable ad units. A flippable ad unit may include a primary view, display, or side, and one or more alternate views, displays, or sides. By using a two-sided flippable ad unit, an advertiser may, for example, present an advertisement for a product in a primary ad display, and in an alternate ad display, may present a companion ad such as retail locations near the viewer where the product may be purchased. Programming that implements flippable ad units may include visualization of the transition from a primary view to an alternate view using animation and three dimensional (3D) transitions to create a realistic rotation or flipping effect that the viewer may find interesting and that accordingly may improve the viewer's ad viewing experience.

In the disclosure that follows, reference is made to systems and methods that implement multi-dimensional, flippable ad units for use with online advertising. However, the disclosed systems and methods may be applied to media objects other than online advertisements.

In an embodiment, the thus-enabled flippable ad units may be loaded and displayed on a media player as a primary ad display, and the primary ad display then may be flipped, or rotated, along an axis (e.g., X-axis, Y-axis, or at an angle), or may be rotated around multiple axes, such as rotation around both the X- and Y-axes, to provide an alternative display (or displays) with additional information related to the advertised product. Thus, the flippable ad unit may include a primary ad display and one or more alternate ad displays. The flippable ad unit is, in effect, a multi-sided, 3D virtual object. In an aspect, the flippable ad unit may be instantiated as a virtual body of revolution, such as a revolving cube that shows four or six separate views or displays related to the same product or related products. The herein disclosed flippable ad units make use of a virtual 3D space to increase information display for an advertisement and to increase viewer interest in, and thus attention to, an advertisement.

The flippable ad units may be displayed in a flippable ad unit interface that is available through or on a media player. The programming needed to implement flippable ad units may be written in flash or HTML. In an aspect, underlying HTML may include a series of headers (H3 tags) and content divisions so that ad content is usable without JavaScript. The flippable ad interface and the programming that implements flippable ad unit features may be cached in a browser on a media display device such as a smart phone, a tablet, a computer, or an Internet-enabled television. The flippable ad unit may mimic a real world object such as a postcard or advertising booklet/brochure where both sides of a sheet may be used to provide product information. In addition to more effective use of the limited space available for an advertisement, other advantages exist with flippable ad units: for example, using a flippable ad interface, viewers do not have to navigate away from Web pages they currently are viewing or suspend or quit an activities in which they currently are engaged (e.g., watching a video or video advertisement on a watch page) to learn more about the advertised product or to act upon or otherwise interact with the advertisement. This flippable ad feature may help advertisers better understand a viewer's interests and intentions; a viewer may use the flippable ad feature to access additional information such as local business locations, reviews, maps and more. An advertiser may use the alternative ad display (the flipped side) of the flippable ad unit to receive viewer feedback about the advertisement or the advertised product. An advertiser may use the feedback to improve the viewer's ad viewing experiences during subsequent ad viewings. In an aspect, the alternate ad display may be served only when a viewer clicks on/selects an option in the flippable ad unit interface to rotate the flippable ad unit; as a result, the availability of an alternate ad display will not affect the page load times for the primary ad display. The flippable ad unit may be particularly useful on media devices having small screen real estate, such as mobile phones and tablets.

The flippable ad features may apply to full screen advertisements as well as to smaller-scale advertisements that may be provided, for example, on a video watch page. The flippable ad unit may display on one side a video ad and on another side a display ad. The flippable ad unit may show a national advertisement (video, animated, static) in a primary ad display and local, dynamic, or real-time information in an alternate ad display. With a flippable ad unit, when a currently playing video ad (for example, in a primary ad display) is flipped, the video ad may pause until redisplayed (i.e., the flippable ad unit is returned to the primary ad display). A flippable ad unit may flip around the Y-axis to provide a first alternate ad display, around the X-axis to provide a second alternate ad display, and around a diagonal axis to provide a third alternate ad display. The ads displayed in any of the alternate ad displays may be companion ads or otherwise relate in some manner to the ad in the primary ad display. When, in addition to a primary ad display, more than three alternate ad displays are desired, the flippable ad unit may be implemented as a virtual body of revolution (e.g., a cube may have a total of six ad displays).

A flippable ad unit may enable display of a flip actuation button as part of the flippable ad unit interface. The flip actuation button may include arrows or pointers indicating possible flip modes (e.g., a horizontal arrow would indicate the ad may flip around the Y-axis to show an alternate ad display). The flip actuation button may include text (e.g., a short message such as "See dealers near you."). The flip actuation button may include an icon or number showing or indicating available alternate ad displays. In an aspect, when a viewer hovers a pointer over the icons or numbers, the flippable ad unit interface may provide a display of the subject matter of the ad to be served in the corresponding alternate ad display. The flip actuation button may be disabled until the viewer signs on to a service or Web site. The flip actuation button may be disabled until the ad in the primary ad display has been viewed (e.g., a video ad has played to completion or near completion, has not been skipped, etc.). The flip actuation button may be grayed out when not enabled.

In an embodiment, when a primary ad display of a flippable ad unit is loaded on a media device, the media device may store one or more small files associated with the primary ad display. When the flippable ad unit is rotated from the primary ad display to an alternate ad display, additional files associated with the alternate ad display may be stored. Data contained in the stored files (e.g., cookies) may be used to record viewer interaction with the flippable ad unit. By accessing the stored files, advertisers may obtain information indicating when a viewer has rotated a flippable ad unit and what interactions the viewer may have had with the flippable ad unit. An advertiser may make use of the recorded data to improve performance of its advertising campaign. For example, the advertiser may use the recorded data as part of an ad remarketing plan in which the advertiser serves follow-on ads to viewers who previously viewed certain flippable ad displays. As an aspect of this example, an advertiser may dynamically change the content of an alternate ad display of a flippable ad unit based on an ad in the primary ad display or in an alternate ad display being previously viewed. As a further example of this aspect, assume an alternate ad display provided a viewer a ten percent off coupon for an advertised product and that the viewer interacted with the alternate ad display to acquire the coupon. Subsequent serving of ad displays for the same flippable ad unit may result in the "ten percent off coupon" alternate ad display not being available to serve to the viewer's media device.

FIG. 1 illustrates an example environment that supports multi-dimensional, flippable ad units. In FIG. 1, environment 10 includes media publisher 20, advertiser 40, and media viewer 66 at viewing location 60, all of which may communicate over communications network 50. The media publisher 20 distributes or makes available media objects to media devices 62 and 63 operated by the viewer 66. The media publisher 20 receives media objects, which may be organized into channels and the channels organized into channel collections, from a content creator (not shown). The advertiser 40 provides advertisements that may be served in conjunction with display of media objects.

As used herein, media objects may include videos, animations, still images, advertisements, audio tracks, games, applications, Web sites, blogs, documents, social media posts, short message system (SMS) messages, emails, blogs; in short, a media object may be any electronic media form and any electronic content item/media object. However, for simplicity, the description that follows primarily refers to media objects as objects displayed on Internet Web pages.

The media publisher 20 operates Web server 22, which hosts Web site 30. The Web site 30 may be an Internet search Web site; a social network Web site; a commercial Web site selling products and services, and providing information about the products and services; and an online service such as an online banking service or an online dating service. The Web site 30 includes Web pages 32. The Web server 22 provides links to enable navigation among the Web pages 32. The Web server 22 may display, on any of the Web pages 32, links to other Web sites. The Web site 30 may display media. The media publisher 20 also may serve advertisements provided by advertiser 40. The media publisher 20 may operate a subscription service, and viewers 66 may register with the media publisher 20 and sign on to the subscription service. However, the media publisher 20 may provide content or media to any viewers 66 regardless of their status as subscribers and whether or not they have signed on to the subscription service.

The advertiser 40 operates ad server 42 to provide advertisements 44 that are served on the Web pages 32. The advertiser 40 may represent a single company or entity, a group of related companies, or a group of unrelated companies (e.g., the advertiser 40 may operate as an ad broker). The advertiser 40 may operate the ad server 42 to provide one or more Web sites 48. The advertisements 44 provided for display on the Web pages 32 may be static advertisements or non-static advertisements. The advertisements 44 may include audio, video, and animation features. The advertisements 44 may be in a rich media format. The advertisements 44 may be displayed on a Web page 32 at the same time that another media object (e.g., a video) is being displayed on the Web page 32. The advertisements 44 may be shown as an overlay to a video, before and/or after display of the video, and during pauses in the video. The advertisements 44 may be served in specific locations of the Web page 32 while the video is displayed in a different location of the Web page 32. The advertisements 44 may change during display of a video. In an aspect, certain of the advertisements 44 are multi-dimensional, or flippable, ad units.

The network 50 may be any communications network that allows the transmission of signals, media, messages, voice, and data among the devices and systems shown in FIG. 1, including radio, linear broadcast (over-the-air, cable, and satellite) television, on-demand channels, over-the-top media, including streaming video, movies, video clips, and games, and text, email, and still images, and transmission of signals, media, messages, voice, and data from a media device to another media device, computer, or server. The network 50 includes the Internet, cellular systems, and other current and future mechanisms for transmission of these and other media objects. The network 50 may be both wired and wireless.

The viewing location 60 may be the residence of an individual viewer, such as viewer 66, who operates media devices 62 and 63 to access (for example, through router 64) media objects such as videos at the Web site 30. The media devices 62 and 63 may be fixed or mobile. For example, media device 62 may be an Internet connected "smart" television (ITV); a "basic" or "smart" television connected to a set top box (STB) or other Internet-enabled device; a Blu-ray™ player; a game box; a desk top computer, or a radio, for example. Media device 63 may be a tablet, a smart phone, or a laptop computer, for example. The media devices 62 and 63 may include browsers, such as browser 200. The browser 200 may be a software application for retrieving, presenting, and traversing resources such as at the Web site 30.

A resource may be identified by a Uniform Resource Locator (URL) and may be a Web site, Web page, image, video, or other content. The URL may allow the browser 200 to connect to the Web site 30. Hyperlinks present in resources enable the viewer 66 to navigate the browser 200 to related resources. The viewer 66 may operate the browser 200 to search for Web sites related to specific topics or to search for a specific Web site by URL. The media devices 62 and 63 also may include applications 230. The viewer 66 may cause the media devices 62 or 63 to execute an application 230, such as a mobile banking application, to access online banking services. The application 230 may involve use of a browser or other means, including cellular means, to connect to the online banking services. Once connected to the Web site 30, the media devices 62 and 63 may allow viewing of media objects such as videos and static content (e.g., text and still images) displayed on the Web pages 32 at the Web site 30. The video programs and static content may include availabilities (slots, locations or spaces) into which advertisements 44 may be served.

Figure 2A:
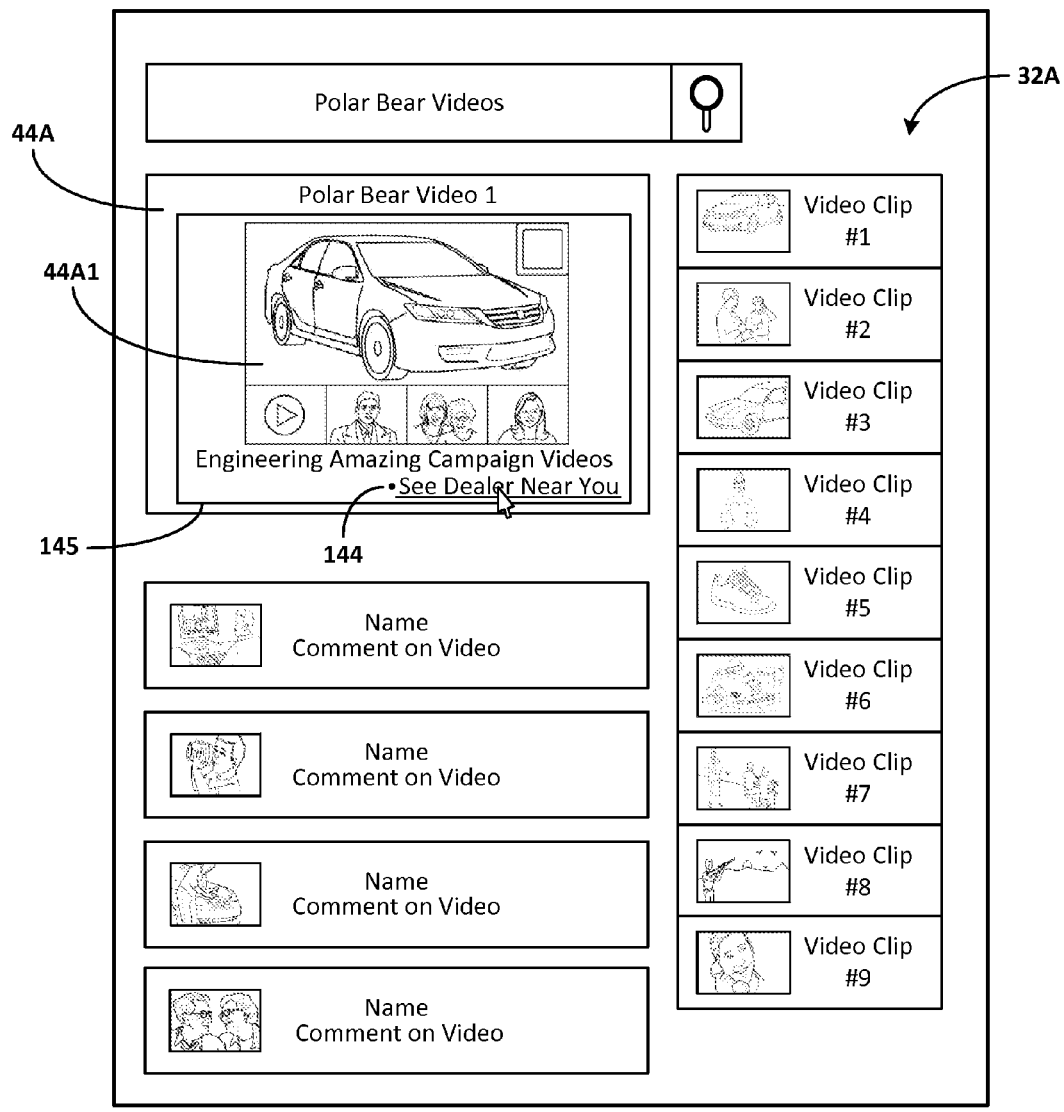
FIG. 2A illustrates example flippable ad displays, interfaces, and features.

FIGS. 2A-2F illustrate example flippable ad units and associated interfaces and features. In FIG. 2A, flippable ad unit 44A is shown initially displayed on Web page 32A as a pre-roll video ad intended to be viewed prior to display of a polar bear video. The flippable ad unit 44A includes primary ad display 44A1, which is a pre-roll video ad for a luxury automobile. The flippable ad unit 44A includes ad display, or flip actuation button, 144, which may be used to access one or more alternate ad displays for the luxury automobile. The flip actuation button 144 may be part of a flippable ad unit interface. The flip actuation button is described in more detail with respect to FIGS. 2E and 2F, and FIG. 3B. In FIG. 2A, the interface also is shown to include a text box 145 (with example text message "See dealers near you)," which indicates what information may be available on an alternate ad display.

FIGS. 2B-2D illustrate flippable ad unit 44A in more detail. FIG. 2B shows flippable ad unit 44A with primary ad display 44A1 illustrated. FIG. 2C illustrates the flippable ad unit 44A in the process of rotation. FIG. 2D shows the flippable ad unit 44A with alternate ad display 44A2 illustrated. The ad shown in the alternate ad display 44A2 is a static companion ad that may be dynamically populated with information personalized to the viewer 66—in FIG. 2D, automobile dealers nearest to the viewer's viewing location 60.

Figure 2F:
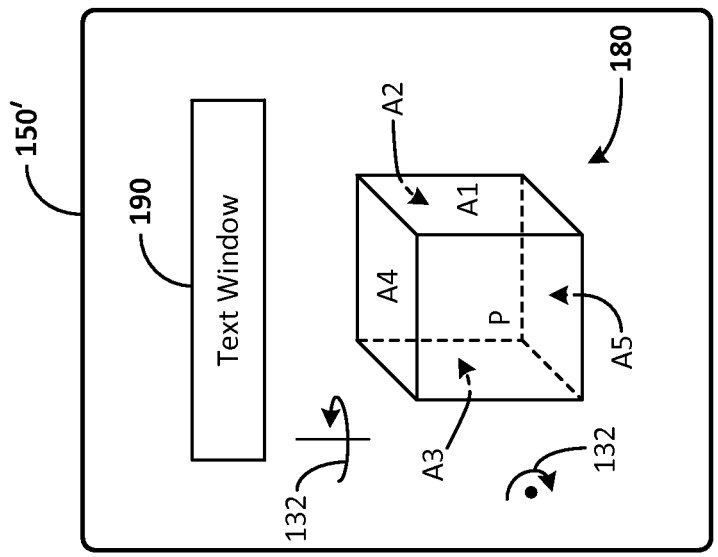
FIG. 2F illustrates example flippable ad displays, interfaces, and features.
Figure 2E:
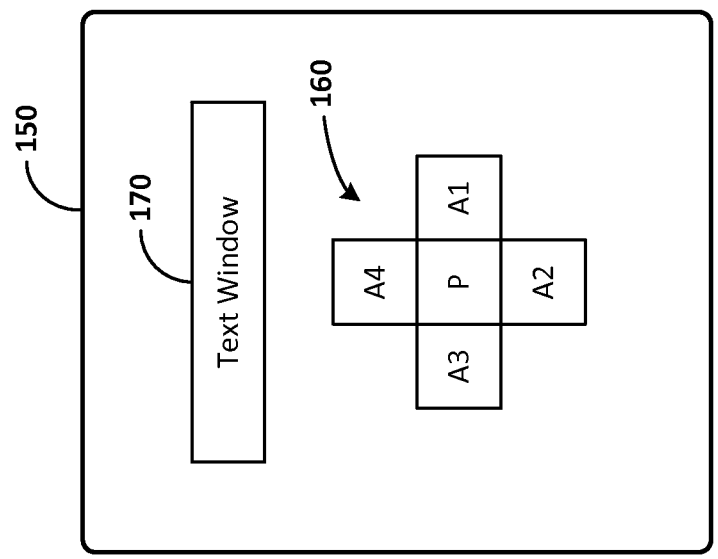
FIG. 2E illustrates example flippable ad displays, interfaces, and features.

FIG. 2E illustrates components of an example flippable ad unit interface. In FIG. 2E, interface 150 includes ad display selection button, or flip actuation button, 160 having five sections P and A1-A4, each section representing either a primary ad display or an alternate ad display available with the flippable ad unit represented in the interface 150, and each section shown in the interface 150. Also shown is text window 170. The interface 150 may be populated with the button 160 and text window 170 when the Web server 22 serves a primary ad as part of a flippable ad unit. The primary ad may be accompanied by an index that allows programming in the browser 200 to construct and display the interface 150. That is, the index may provide data, arranged in data sets for each of a number of alternate ad and corresponding alternate ad displays, that allows the browser 200 to determine there are four available alternate ad displays and to construct a flip actuation button that shows these alternate ad displays, and the primary ad display, as part of the interface 150. In an aspect, the index may be a dynamic data object in the sense that it initially may be tailored to a specific viewer 66. The index further may change in response to actions taken by the viewer 66 in terms of interaction with a companion ad provided in one of the alternate ad displays, or the primary ad provided in the primary ad display. Thus, the interface 150 is constructed, updated, and displayed on-the-fly by programming in the browser 200 in response to data provided by the Web server 22 and actions initiated by the viewer. In addition to data need to construct and display the flippable ad button 160, the initial loading of the primary ad may include data that allows the browser 200 to display a short text message in window 170 when a viewer 66 hovers a pointer over one of the sections P, A1-A4. In an aspect, the alternate sections A1-A4 may be grayed out, or the button 160 may not be displayed when the viewer 66 has not signed on with the Web server 22 and/or when no alternate ads are appropriate for the viewer 66 (based on the viewer 66 signing on or on other data available to the Web server 22).

The flip actuation button 160 may change in format depending on the media device on which it is displayed. For example, on a smart television or computer, the sections of the button 160 may provide additional data, including text, while on a media device such as a smart phone with limited screen real estate, the sections may show only numbers.

The flip actuation button 160 may include and expand/collapse feature. The feature may be accessed through a viewer's "right-click" operation of a pointing device. When collapsed, the flip actuation button 160 may display only a single section, such as section A1, which may represent the advertiser's next preferred alternate ad. When expanded, the button 160 may show all available sections, as illustrated in FIG. 2E.

FIG. 2F illustrates another example flippable ad unit interface. In FIG. 2F, the web server 22 has determined that the viewer may be presented with a primary ad and as many as five companion ads. The Web server 22 serves the primary ad and an index for five companion ads at media device 63. Programming in browser 200 constructs a virtual cube, with each face of the virtual cube representing either the primary ad or a companion ad, as a flip actuation button 180. The flip actuation button 180 also includes rotation arrows 182, which a viewer 66 may select to rotate the flip actuation button 180 to show a selectable face. The selectable face may be highlighted and the non-selectable faces may be grayed out. When a face is shown enabled, text window 190 may show a short text message related to the subject of the corresponding companion ad.

Other flip actuation button formats are possible.

Figure 3A:
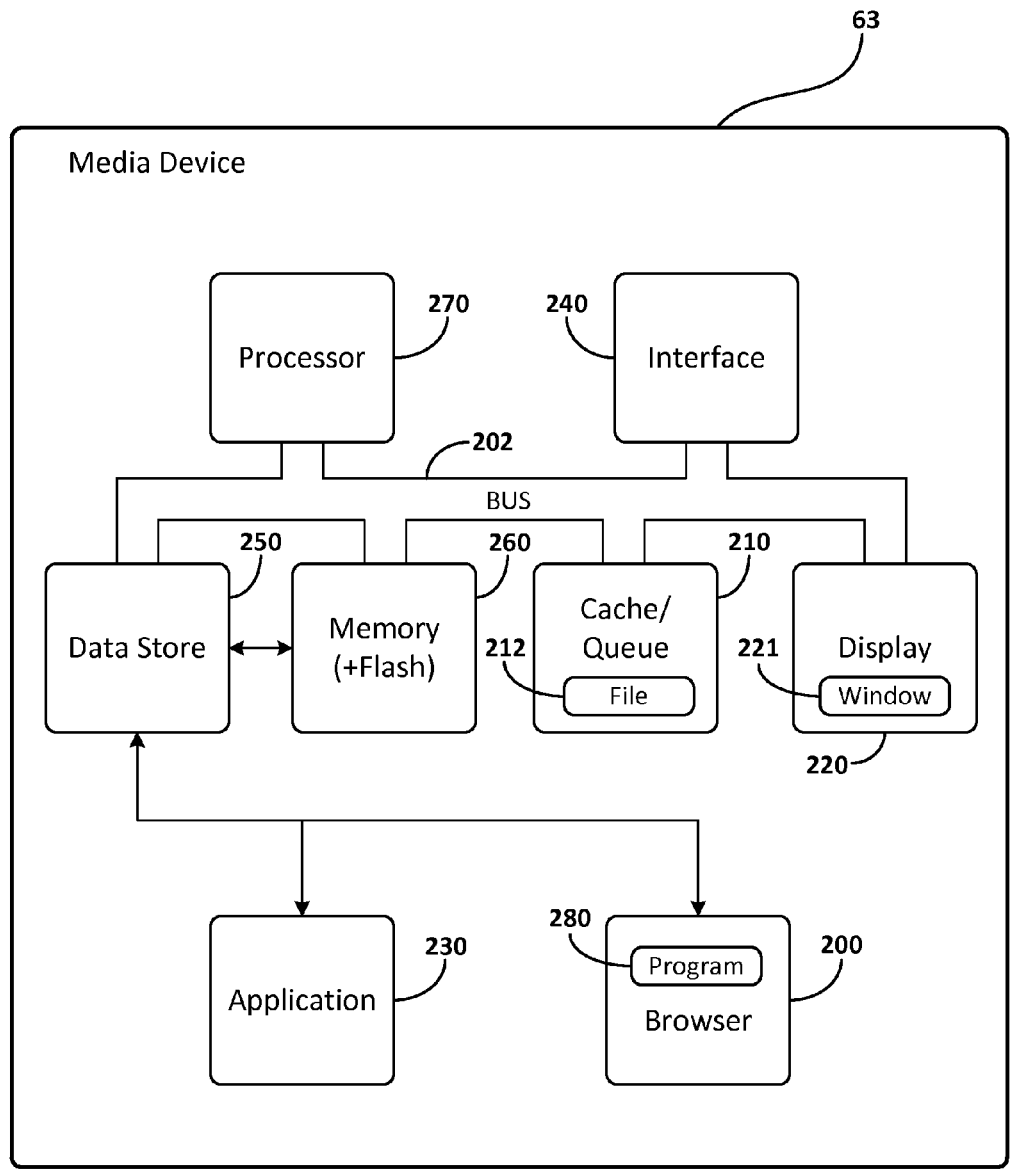
FIG. 3A illustrates example systems that implement flippable ads.
Figure 3B:
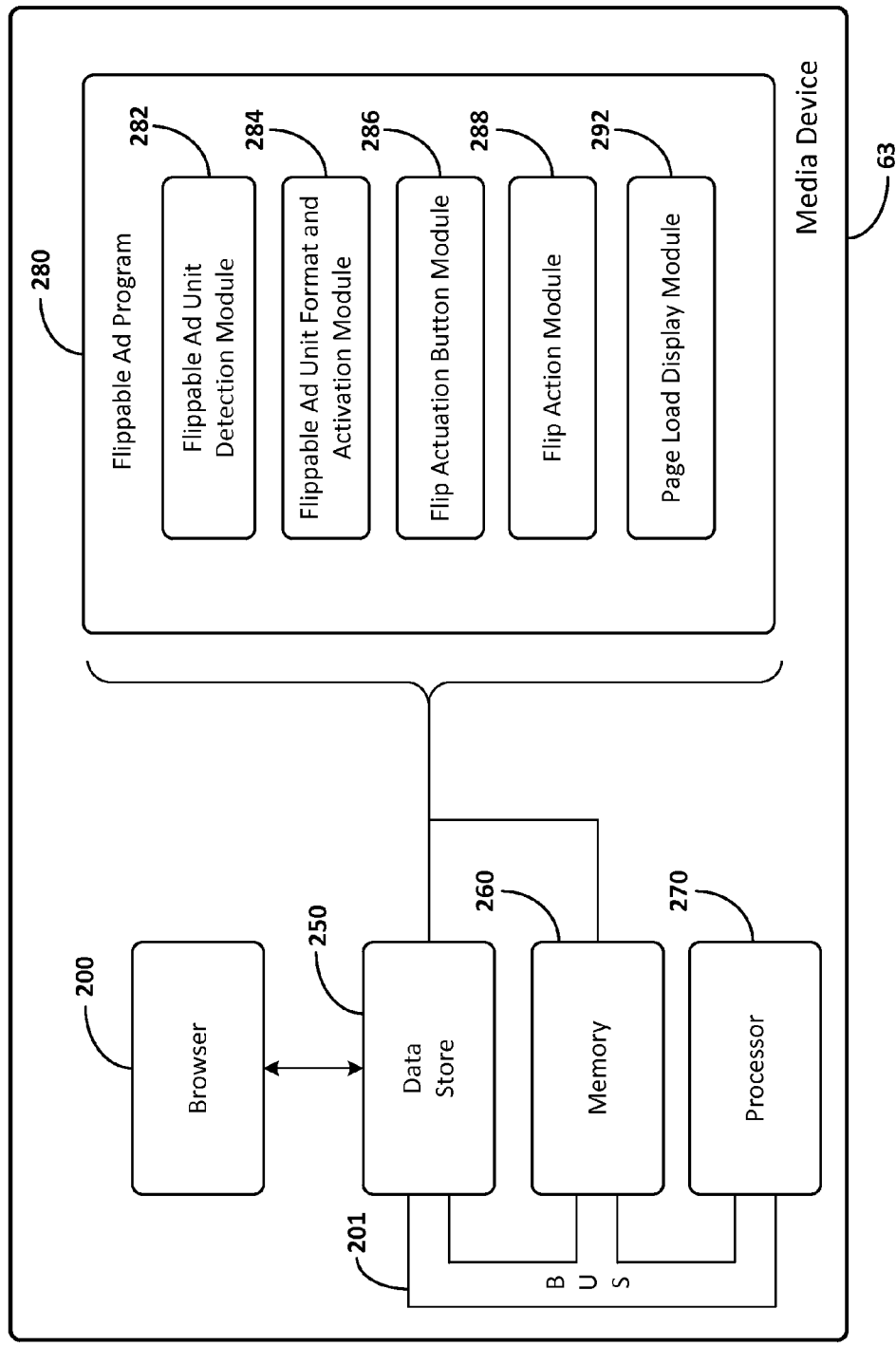
FIG. 3B illustrates example systems that implement flippable ads.
Figure 3C:
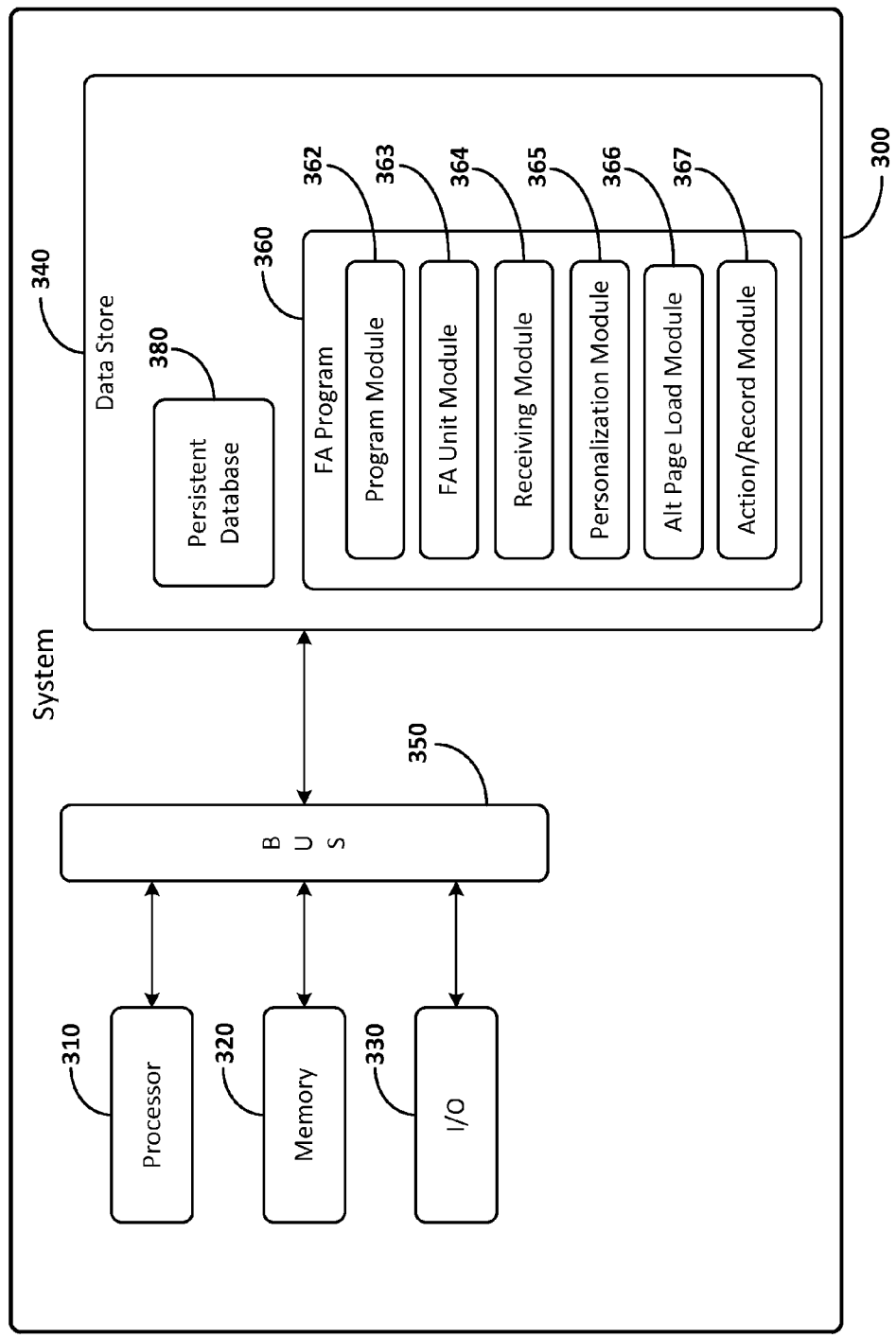
FIG. 3C illustrates example systems that implement flippable ads.

FIGS. 3A-3C illustrate example systems that implement flippable ads. FIG. 3A illustrates an example media device (e.g., media device 63) having downloaded thereon a program that enables display of flippable ad units. In FIG. 3A, media device 63 includes browser 200, cache/queue 210, display 220, application 230, interface 240, data store 250, memory 260, and processor 270. The processor 270, interface 240, data store 250, memory 260, cache 210, and display 220 are connected by communications and data bus 202. The browser 200 may be a software program for retrieving, presenting, and traversing resources such as at the Web site 30. The browser 200 may be stored in the data store 250 and loaded into memory 260 by the processor 270. Hyperlinks present in resources enable the viewer 66 to navigate the browser 200 to related resources. When operating browser 200, the viewer 66 may scroll up or down, left or right, in order to view the entire Web page 32. The browser 200 enables the viewer 66 to access, retrieve and view content, media objects, and other resources on the Internet. The browser 200 also may be used to access information provided by Web servers in private networks or files in file systems.

The browser 200 may include computer code to store a file 212 in cache/queue 210 and record viewer actions. The browser 200 may store information related to Web site visits, including the URL of the Web site, date and time of visit, length of visit (or start and stop time of visit), and actions taken by the viewer 66 during the visit.

In an example, when a viewer 66 visits the Web site 30 (or uses an application 230) the file 212 may store a random ID of the browser 200 but no other data. In this example, the contents of the file 212 may be provided to the media publisher 20 by way of the Web server 22. If the viewer 66 logs on to the Web site 30, the Web server 22 may use this log on to correlate the viewer 66 with the random ID, and may use this correlation when, for example, selecting alternate ad displays to accompany a primary ad display of flippable ad unit 44A for possible viewing by the viewer 66.

The cache/queue 210 stores information related to operation of the browser 200. The information may include the URLs of the Web pages 32, as well as other data.

The display 220 includes programming and hardware aspects that provide a display screen or browser window 221 and the programming and hardware to display the content, content segment references, and data and information stored in the cache 210.

The application 230 may be installed on the media device 63 to perform a specific function. For example, the application 230 may be a mobile banking application. The application 230 may be stored in the data store 250, and loaded into memory 260 and executed by the processor 270.

The interface 240 includes a data entry device such as a keyboard, a mouse, a speaker, and a voice command input such as a microphone.

Operation of the interface 240 may provide the viewer 66 with audio and visual features. The interface 240 also includes programming aspects such as scrolling features that allow the viewer 66 to change a position of the displayed Web page 32 relative to the display 220 and the browser window 201.

The data store 250 is or includes a non-transitory computer-readable storage medium. The data store 250 may be embodied in many forms, such as a hard disk drive, a magnetic disk drive, an optical disk drive, a tape drive, or another type of computer-readable media which can store data that are accessible by the processor 270. The data store 250 may store programming to operate the media device 63 and applications that execute on the media device 63. In addition, the data store 250 may include flippable ad program 280, stored as a component of browser 200.

The memory 260 stores the above-mentioned programming and other programming such as an operating system (not shown) for execution by the processor 270 to operate the media device 63.

When visiting the Web site 30, the viewer 66 may register with and log on to the Web site 30 by providing a viewer-created identification (hereafter, a user ID) and a password and/or pass code, for example. Alternately, the viewer 66 may access the Web site 30 without registering and without logging on. Whether or not logged on, the viewer 66 may access and view videos and other media at the Web site 30. In addition, whether or not logged on, the viewer 66 may access flippable ad units 44A, and may view primary and alternate ad displays of the flippable ad units 44A. However, by logging on at the Web server 22, the viewer 66 may access additional features of the program 280, including, for example, accessing alternate ad displays that are tailored to the viewer 66.

When using an application 230, the viewer 66 may make various selections that also may be recorded by the Web server 22. Similar to the browser 200, the application 230 may store in file 212 viewer identification information, Internet address information, and other data and information related to use of the application 230.

FIG. 3B illustrates flippable ad program 280. The program 280 may be downloaded to media device 63 and stored as part of browser 200 so as to implement flippable ad units on media device 63. In FIG. 3B, program 280 includes flippable ad unit detection module 282, flippable ad unit format and actuation module 284, flip actuation button module 286, flip action module 288, and page load/display module 292. The flippable ad unit detection module 282 detects that an ad loaded on a Web page displayed by browser 200 is a flippable ad associated with a flippable ad unit. The detection module 282 may perform this detection by reading a header of an ad as the ad loads. Note that a flippable ad unit may be displayed in a media player, such as shown if FIG. 2A. Alternately, the flippable ad unit may be a full-screen or full-page ad. The flippable ad unit may include video ads, animated ads, rich media ads, display ads, or any combination of these ad formats. Other ad formats are possible for inclusion in a flippable ad unit.

In addition to display through a Web page, a flippable ad unit may be displayed through an application, including a mobile application. Thus, the detection module 282 may detect a flippable ad as the ad loads on a mobile application executing on a mobile media device.

Flippable ad format and actuation module 284 provides programming to animate the rotation of a flippable ad unit to show a primary ad display and one or more alternate ad displays. The animation may include an apparently rotating display, rotation arrows, and audio indicative of rotation (e.g., a "swooshing" sound).

Flip actuation button module 286 provides a flip actuation button, rotation symbols or icons, and a text window. For a two-sided flippable ad unit, the module 286 may provide the flip actuation button and the text window may include a summary of what may be seen on the flipped side of the flippable ad unit. In an aspect, the module 286 provides the flip actuation button as grayed-out (not active or enabled) until after the viewer 66 has viewed the primary ad display for a specified time (e.g., has watched all or the majority of a video ad). In another aspect, the module 286 provides the flip actuation button as grayed out until the viewer 66 signs on at the Web server 22. In still another aspect, the flip actuation button always is enabled.

To provide a dynamically configured flip actuation button as part of a flippable ad unit interface, the flip actuation button module 286, or other components of the program 280, such as the flip action module 288, may communicate with corresponding programming at the Web server 22. Flip action module 288 records actions taken by the viewer 66 to rotate a flippable ad unit. The information may indicate that the viewer 66 rotated the flippable ad unit after viewing the primary ad display for a time. The primary ad display may include several available videos, as shown in FIG. 2A. The alternate ad display may include links to other Web pages, as shown in FIG. 2D. The module 288 may record any of these interactions. In addition, the module 288 may signal a remote server that the viewer 66 has initiated a flip action by clicking on the flip button, for example. The module 288 may provide this flip signal Through, for example, browser 200) to a remote server such as the Web server 22, and in response, the Web server 22 may return an alternate ad for display in the alternate ad display.

The ad request initiated by rotation of the flippable ad unit may be specific to the rotated-to alternate ad display. Referring to the examples of FIGS. 2B-2D, rotation of the flippable ad unit 44A to alternate ad display 44A2 causes the browser 200 to send an ad request to the Web server 22 to display information related to luxury car dealers near the viewer's viewing location 60.

As noted above, the flip action module 288 may be executed to provide a dynamically changeable flip action button. When a viewer 66 interacts with the flippable ad unit 44A, the module may signal the Web server 22, and in response the Web server 22 may send a revised or updated index to the viewer's media device 63. The flip actuation button module 286 then may use the revised index to construct a flip action button reflecting data sets contained in the revised index.

Page load/display module 292 receives a new page (e.g., an alternate display) associated with a flippable ad unit and displays the new page in the media player or media device display screen.

FIG. 3C illustrates system 300, which is implemented on Web server 22 of FIG. 1. However, all or parts of the system 300 may be implemented on physically and/or virtually separated servers. Furthermore, the system 300 may be replicated, in relevant part, in multiple physically and/or virtually separated servers to improve efficiency and speed of operation through parallel processing. Thus, aspects of the system 300 may be implemented in a distributed computing network and the system 300 may allow for distributed hosted services of the media object provider 20.

A specific instance of the system 300 may include processor 310, memory 320, input/output 330, and data store 340, all connected together by data and communications bus 350. The data store 340 may be a non-transitory computer-readable storage medium. The data store 340 may include flippable ad program 360, which is loaded into memory 320 by the processor 310 and then executed to provide for distribution and operation of flippable ad units. The data store 340 may include flippable ad database 380. The input/output 330 allows for communications with other machines, such as the server 42 and the browsers 200 (see FIG. 1) and with human operators.

The flippable ad program 360 includes program module 362, flippable ad unit module 363, receiving module 364, personalization module 365, alternate page loading module 366 and action/recording module 367. Program module 362 provides flippable ad programming to media devices to enable the media devices to display flippable ads. The program module 362 may read files stored on media devices to determine if such programming should be provided to the media devices. The flippable ad programming may be provided when a flippable ad unit first is served on a media device. The flippable ad programming may provide a flippable ad unit interface. The flippable ad programming may include animation features that show the primary and alternate ad displays rotating as selected by the viewer 66.

Flippable ad unit module 363 serves ads for flippable ad units at media devices. The ads first may be served to and loaded on media devices as a primary ad display of a flippable ad unit.

Receiving module 364 receives ad requests from media device 63 to serve an ad in an alternate ad display.

Personalization module 365 uses information identifying the media device 63 and/or the viewer 66 to select an alternate ad to serve in an alternate display of the flippable ad unit.

Alternate page loading module 366 serves an alternate ad to the media device 63.

Action/recording module 367 records information received from the media device 63 related to actions taken by a viewer 66 as recorded in the media device 63.

The methods executed by the herein disclosed system 360 of FIG. 3C and the corresponding system 380 of FIGS. 3A and 3B involve use of information that in some respect identifies a device the viewer 66 uses to access the Internet-based content. For example, when a viewer 66 uses an Internet browser to access a Web site, a Web server may create a random identification (ID) that identifies the browser and may cause the random ID to be stored on the viewer's device.

In situations in which the systems disclosed herein collect personal information about viewers, or may make use of personal information, the viewers 66 may be provided with an opportunity to control whether programs or features collect viewer information (e.g., information about a viewer's social network, social actions or activities, profession, a viewer's preferences, or a viewer's current location), or to control whether and/or how to receive advertisements from an ad server that may be more relevant or of interest to the viewer 66. In addition, certain data may be treated in one or more ways before it is stored or used, so that personally identifiable information is removed. For example, a viewer's identity may be treated so that no personally identifiable information can be determined for the viewer 66, or a viewer's geographic location may be generalized where location information is obtained (such as to a city, ZIP code, or state level), so that a particular location of a viewer cannot be determined. Thus, the viewer 66 may control how information is collected about the viewer 66 and used by a server.

Figure 4:
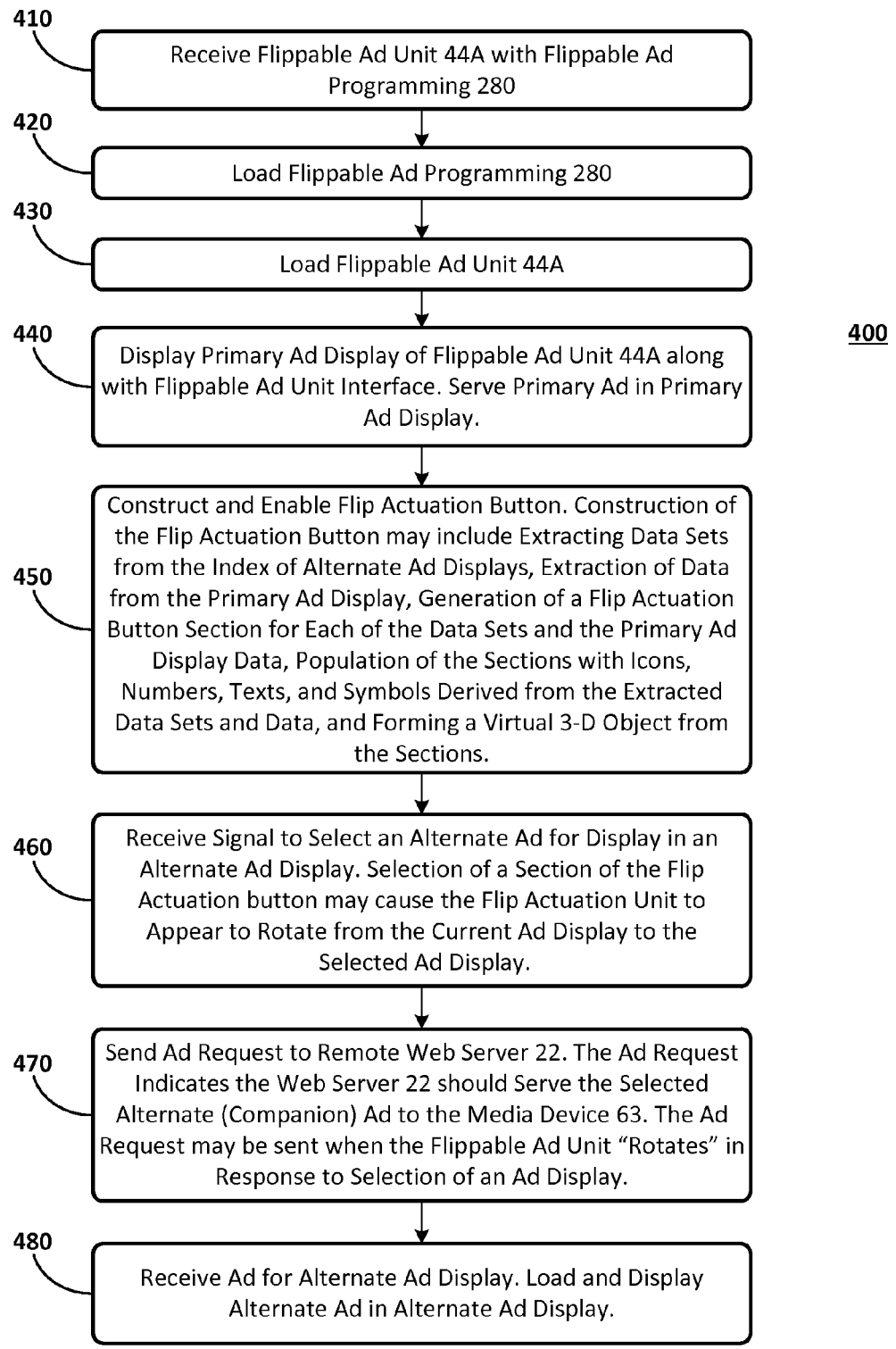
FIG. 4 illustrates example methods for implementing flippable ads.
Figure 5:
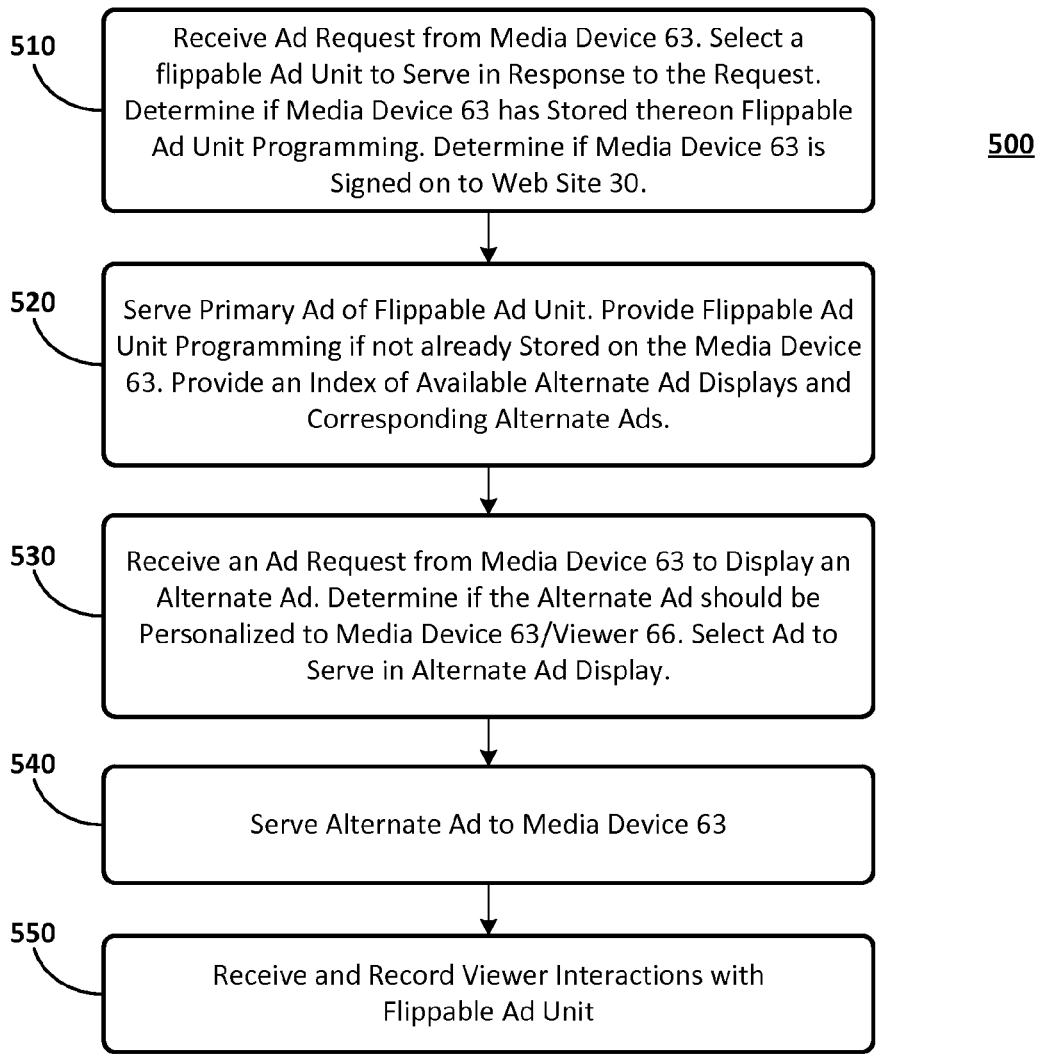
FIG. 5 illustrates example methods for implementing flippable ads.

FIGS. 4 and 5 illustrate example methods for implementing flippable ads. The example methods are based on the media device 63 shown in FIG. 3A, the systems of FIGS. 3B and 3C, the components of FIG. 1, and the flippable ad unit 44 of FIGS. 2A-2D. In FIG. 4, method 400 includes:

Block 410: Receive flippable ad unit 44A with flippable ad programming 280.

Block 420: Load flippable ad programming 280.

Block 430: Load flippable ad unit 44A. The flippable ad unit 44A may include an index of alternate ads that are available to be served at media device 63. The index may include data arranged in data sets, a data set for each available alternate ad display of the flippable ad unit 44A. The data sets also may include data specific to alternate ads that may be served in the alternate ad displays. Some alternate ads may be available only after the viewer 66 has signed on at the Web server 22 to the subscription service offered by media publisher 20.

Block 440: Display primary ad display of flippable ad unit 44A along with flippable ad unit interface. Serve primary ad in primary ad display. Since the primary ad and primary ad display are now cached in the browser 200, the flip actuation button may be constructed with reference to these data.

Block 450: Construct and enable flip actuation button. Construction of the flip actuation button may include extracting data sets from the index of alternate ad displays, extraction of data from the primary ad display, generation of a flip actuation button section for each of the data sets and the primary ad display data, population of the sections with icons, numbers, texts, and symbols derived from the extracted data sets and data, and forming a virtual 3_d object from the sections. The button may be enabled for all viewers, only for those viewers who are registered with and signed onto the subscription service, or for those viewers who have met viewing requirements that may exist for the ad in the primary ad display (e.g., watched 75 percent of a video ad; did not skip a skippable ad).

Block 460: Receive signal to select an alternate ad for display in an alternate ad display. The signal may originate when the viewer 66 clicks on the flip actuation button. Selection of a section of the flip actuation button may cause the flip actuation unit to appear to rotate from the current ad display to the selected ad display.

Block 470: Send ad request to remote Web server 22. The ad request indicates the Web server 22 should serve the selected alternate (companion) ad to the media device 63. The ad request may be sent when the flippable ad unit "rotates" in response to selection of an ad display.

Block 480: Receive ad for alternate ad display. This alternate ad display and corresponding ad may be tailored or personalized to the viewer 66. For example, the alternate ad may show product retailers within a certain radius of the viewer's viewing location 60 as determined by a registered address, an IP address of the media device, or a GPS or other geo-positioning location. Load and display alternate ad in alternate ad display.

FIG. 5 illustrates method 500 executed on a remote Web server 22. Method 500 includes:

Block 510: Receive ad request from media device 63. Select a flippable ad unit to serve in response to the request. Determine if media device 63 has stored thereon flippable ad unit programming. Determine if media device 63 is signed on to Web site 30.

Block 520: Serve primary ad of flippable ad unit. Provide flippable ad unit programming if not already stored on media device 63. Provide an index of available alternate ad displays and corresponding alternate ads.

Block 530: Receive an ad request from media device 63 to display an alternate ad. Determine if the alternate ad should be personalized to media device 63/viewer 66. Select ad to serve in alternate ad display.

Block 540: Serve alternate ad to media device 63.

Block 550: Receive and record viewer interactions with flippable ad unit.

Certain of the devices shown in FIGS. 1, 3A and 3C include a computing system. The computing system includes a processor (CPU) and a system bus that couples various system components including a system memory such as read only memory (ROM) and random access memory (RAM), to the processor. Other system memory may be available for use as well. The computing system may include more than one processor or a group or cluster of computing system networked together to provide greater processing capability. The system bus may be any of several types of bus structures including a memory bus or memory controller, a peripheral bus, and a local bus using any of a variety of bus architectures. A basic input/output (BIOS) stored in the ROM or the like, may provide basic routines that help to transfer information between elements within the computing system, such as during start-up. The computing system further includes data stores, which maintain a database according to known database management systems. The data stores may be embodied in many forms, such as a hard disk drive, a magnetic disk drive, an optical disk drive, tape drive, or another type of computer readable media which can store data that are accessible by the processor, such as magnetic cassettes, flash memory cards, digital versatile disks, cartridges, random access memories (RAM) and, read only memory (ROM). The data stores may be connected to the system bus by a drive interface. The data stores provide nonvolatile storage of computer readable instructions, data structures, program modules and other data for the computing system.

To enable human (and in some instances, machine) user interaction, the computing system may include an input device, such as a microphone for speech and audio, a touch sensitive screen for gesture or graphical input, keyboard, mouse, motion input, and so forth. An output device can include one or more of a number of output mechanisms. In some instances, multimodal systems enable a user to provide multiple types of input to communicate with the computing system. A communications interface generally enables the computing device system to communicate with one or more other computing devices using various communication and network protocols.

The preceding disclosure refers to flow charts and accompanying descriptions to illustrate the embodiments represented in FIGS. 1-3C. The disclosed devices, components, and systems contemplate using or implementing any suitable technique for performing the steps illustrated. Thus, FIGS. 4 and 5 are for illustration purposes only and the described or similar steps may be performed at any appropriate time, including concurrently, individually, or in combination. In addition, many of the steps in the flow charts may take place simultaneously and/or in different orders than as shown and described. Moreover, the disclosed systems may use processes and methods with additional, fewer, and/or different steps.

Embodiments disclosed herein can be implemented in digital electronic circuitry, or in computer software, firmware, or hardware, including the herein disclosed structures and their equivalents. Some embodiments can be implemented as one or more computer programs, i.e., one or more modules of computer program instructions, encoded on computer storage medium for execution by one or more processors. A computer storage medium can be, or can be included in, a computer-readable storage device, a computer-readable storage substrate, or a random or serial access memory. The computer storage medium also may be, or may be included in, one or more separate physical components or media such as multiple CDs, disks, or other storage devices. The computer readable storage medium does not include a transitory signal.

The herein disclosed methods can be implemented as operations performed by a processor on data stored on one or more computer-readable storage devices or received from other sources.

A computer program (also known as a program, module, engine, software, software application, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

What is claimed is:

1. A method comprising:
   loading, by a processing device, a flippable sponsored content item unit onto a media device, the flippable sponsored content item unit comprising a primary sponsored content item display and one or more alternate sponsored content item displays;
   displaying, by the processing device, a primary sponsored content item in the primary sponsored content item display of the flippable sponsored content item unit upon loading the flippable sponsored content item unit;
   receiving, by the processing device, a select signal to obtain additional information related to the primary sponsored content item, wherein the select signal is received when a flip actuation user interface (UI) element is activated by a viewer of the primary sponsored content item while the primary sponsored content item is being played in the primary sponsored content item display of the flippable sponsored content item unit; and
   in response to receiving the select signal:
      sending a request for the additional information related to the primary sponsored content item, wherein the request for the additional information is sent to a server upon receiving the select signal to avoid impacting a load time for the primary sponsored content item display of the flippable sponsored content item unit;
      receiving, from the server, an alternate sponsored content item comprising the additional information related to the primary sponsored content item;
      rotating, by the processing device, the flippable sponsored content item unit to display an alternate sponsored content item display of the one or more alternate sponsored content item displays; and
      displaying the alternate sponsored content item comprising the additional information related to the primary sponsored content item in the alternate sponsored content item display.

2. The method of claim 1, further comprising:
   receiving and storing flippable sponsored content item programming in the media device;
   displaying the flip actuation UI element;
   enabling the flip actuation UI element to cause the flippable sponsored content item unit to be rotated and the alternate sponsored content item display to be selected; and
   wherein loading the flippable sponsored content item unit comprises:
      loading the primary sponsored content item, and
      loading an index of alternate sponsored content items available for display in the alternate sponsored content item displays.

3. The method of claim 2, wherein enabling the flip actuation UI element comprises:
   executing a sign on process with a service providing the sponsored content items; and
   receiving a sign on complete signal from the service.

4. The method of claim 2, wherein enabling the flip actuation UI element comprises determining by the processor that the primary sponsored content item has been displayed for greater than a threshold time.

5. The method of claim 2, wherein the flip actuation UI element is enabled upon loading the flippable sponsored content item unit.

6. The method of claim 2, further comprising:
constructing the sponsored content item display selection button, comprising:
   extracting data sets from the index for each of the alternate sponsored content items,
   extracting data from the loaded primary sponsored content item,
   generating a flip actuation UI element section for each of the data sets and the data, and
   forming a three-dimensional virtual object from the generated sections.

7. The method of claim 6, further comprising:
updating, reformatting, and redisplaying the flip actuation UI element based on actions completed at the media device.

8. The method of claim 6, further comprising:
displaying a text field with the flip actuation UI element; and
populating the text field with a text message indication of subject matter of the alternate sponsored content item display.

9. The method of claim 1, wherein one or more of the alternate sponsored content items are tailored to the media device based on a geographic location of the media device.

10. The method of claim 1, wherein one or more alternate sponsored content items are tailored to the media device based on a type of the media device.

11. The method of claim 1, wherein the flippable sponsored content item unit is a three-dimensional shape having a first side corresponding to the primary sponsored content item display and one or more additional sides that each correspond to an alternate sponsored content item display to present content related to the primary sponsored content item.

12. A system comprising:
a processor; and
a memory coupled to the processor, wherein the processor is to:
   load a flippable sponsored content item unit onto a media device, the flippable sponsored content item unit comprising a primary sponsored content item display and one or more alternate sponsored content item displays;
   display a primary sponsored content item in the primary sponsored content item display of the flippable sponsored content item unit upon loading the flippable sponsored content item unit;
   receive a select signal to obtain additional information related to the primary sponsored content item, wherein the select signal is received when a flip actuation user interface (UI) element is activated by a viewer of the primary sponsored content item while the primary sponsored content item is being played in the primary sponsored content item display of the flippable sponsored content item unit; and
   in response to receiving the select signal:
      send a request for the additional information related to the primary sponsored content item, wherein the request for the additional information is sent to a server upon receiving the select signal to avoid impacting a load time for the primary sponsored content item display of the flippable sponsored content item unit;
      receive, from the server, an alternate sponsored content item comprising the additional information related to the primary sponsored content item;
      rotate, by the processing device, the flippable sponsored content item unit to display an alternate sponsored content item display of the one or more alternate sponsored content item displays; and
      display the alternate sponsored content item comprising the additional information related to the primary sponsored content item in the alternate sponsored content item display.

13. The system of claim 12, wherein the processor is to:
load the flippable sponsored content item unit by:
   loading the primary sponsored content item, and
   loading an index of alternate sponsored content items available for display in the alternate sponsored content item displays;
   construct the flip actuation UI element, comprising:
      extracting data sets from the index for each of a plurality of alternate sponsored content items,
      extracting data from the loaded primary sponsored content item,
      generating flip actuation UI element section for each of the data sets and the data, and
      forming a three-dimensional (3-D) virtual object from the generated sections;
display the 3-D virtual object as the flip actuation UI element;
display a text field with the flip actuation UI element;
populate the text field with a text message indication of subject matter of a sponsored content item display; and
update, reformat, and redisplay the flip actuation UI element based on actions completed at the media device.

14. A non-transitory computer-readable storage medium comprising instructions, which when executed on a processing device, cause the processing device to perform operations comprising:
loading a flippable sponsored content item unit onto a media device, the flippable sponsored content item unit comprising a primary sponsored content item display and one or more alternate sponsored content item displays;
displaying a primary sponsored content item in the primary sponsored content item display of the flippable sponsored content item unit upon loading the flippable sponsored content item unit;
receiving a select signal to obtain additional information related to the primary sponsored content item, wherein the select signal is received when a flip actuation user interface (UI) element is activated by a viewer of the primary sponsored content item while the primary sponsored content item is being played in the primary sponsored content item display of the flippable sponsored content item unit; and
in response to receiving the select signal:
   sending a request for the additional information related to the primary sponsored content item, wherein the request for the additional information is sent to a server upon receiving the select signal to avoid impacting a load time for the primary sponsored content item display of the flippable sponsored content item unit;

receiving, from the server, an alternate sponsored content item comprising the additional information related to the primary sponsored content item;

rotating, by the processing device, the flippable sponsored content item unit to display an alternate sponsored content item display of the one or more alternate sponsored content item displays; and displaying the alternate sponsored content item comprising the additional information related to the primary sponsored content item in the alternate sponsored content item display.

\* \* \* \* \*